United States Patent
Rao

[15] 3,691,981
[45] Sept. 19, 1972

[54] HOSE RUPTURE INDICATOR
[72] Inventor: Prabhakar B. R. Rao, Cincinnati, Ohio
[73] Assignee: Fluidics, Inc., Cincinnati, Ohio
[22] Filed: Feb. 4, 1972
[21] Appl. No.: 223,434

[52] U.S. Cl. .................. 116/70, 73/419, 116/55, 137/557
[51] Int. Cl. ............................................. G01l 19/12
[58] Field of Search...... 116/55, 65, 70, 34, 114, 117, 116/DIG. 42; 73/419, 146.3, 146.8; 137/557, 224, 227, 228; 340/320

[56] References Cited

UNITED STATES PATENTS

| | | |
|---|---|---|
| 774,874 | 11/1904 | Gesner et al.................. 116/70 |
| 1,753,361 | 4/1930 | Cawthon .................. 116/106 |
| 3,131,667 | 5/1964 | Sajeck .......................... 116/70 |
| 3,276,417 | 10/1966 | Flowers ........................ 116/34 |
| 3,411,477 | 11/1968 | Kudlaty ........................ 116/70 |
| 3,522,789 | 8/1970 | Garrison ....................... 116/34 |

Primary Examiner—Louis J. Capozi
Attorney—John W. Melville et al.

[57] ABSTRACT

A hose rupture indicator adapted to be secured in communication with a fluid line containing hydraulic fluid under pressure. When pressure in the line drops below a predetermined level, an elongated indicator is extended out of the rupture indicator housing to provide an indicator which may be felt in the dark or in a restricted location to immediately apprise an operator which line of a plurality of fluid lines has in fact ruptured.

12 Claims, 3 Drawing Figures

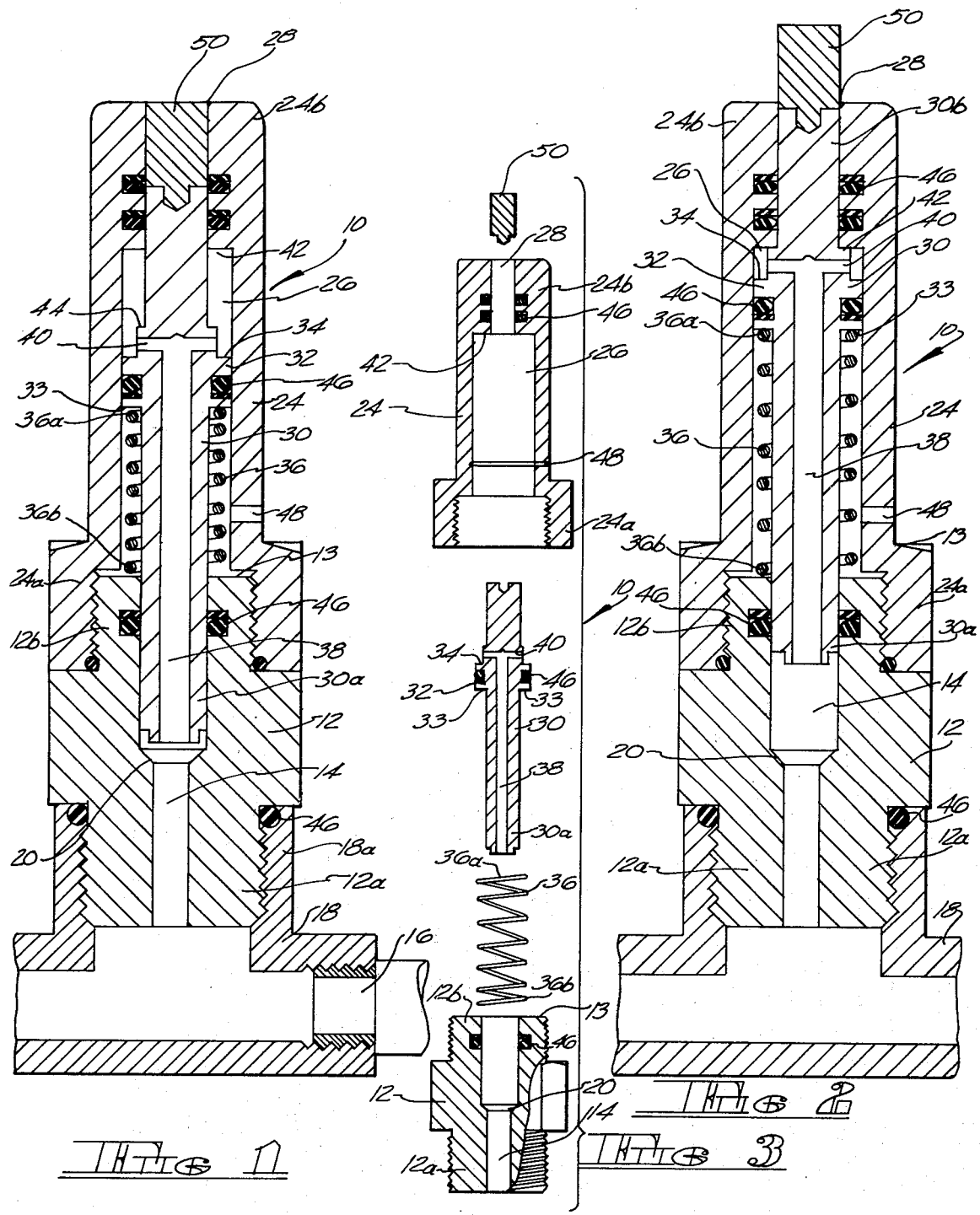

HOSE RUPTURE INDICATOR

BACKGROUND OF THE INVENTION

1. Field of the Invention

This invention relates to pressure indicators for hydraulic systems, and more particularly, to a hose rupture indicator for apprising an operator, who is in the dark or in a restricted location, as to precisely which one of a plurality of hydraulic lines has ruptured.

2. Description of the Prior Art

In the coal mining industry continuous mining machines, shuttle cars and other mining machinery, which are used in substantial darkness and in restricted locations, include a plurality of hydraulic fluid lines or hoses, such as, for example, 15 to 20 lines or hoses. When one such line or hose ruptures, hydraulic fluid is quickly sprayed in all directions, and it is substantially impossible for an operator to ascertain with any certainty which hose has in fact ruptured. In fact, it is not unusual for an operator to expend some four or five hours in order to successfully locate and repair or replace the line or hose which has ruptured, during which time the machine is idle. This problem is particularly accute because circumstances are such in the mining industry as to encourage operators to utilize their machines to the maximum extent, leading to many ruptured hoses.

While many prior art indicators are available, all such indicators have shortcomings and do not satisfactorily solve the aforementioned problem. Additionally, the prior art has been unsuccessful in developing a hose rupture indicator which will immediately apprise an operator as to which line has ruptured and, which at the same time, is tamper proof, so as to provide an indicator which cannot be reset or neutralized until the ruptured line is in fact repaired.

SUMMARY OF THE INVENTION

The present invention provides a hose rupture indicator including a seat having a bore therethrough, one end of the seat being adapted to be secured in communication with a hose containing hydraulic fluid under pressure. One end of a body member having a central bore therethrough is secured to the other end of the seat, with the bores of the seat and the body member in axial alignment. An elongated indicator is movable within the bores of the body member and the seat from a first position, wherein the elongated indicator is completely within the bores of the body member and the seat, to a second position, wherein one end of the indicator conspicuously protrudes through a concentric aperture in the other end of the body member. The elongated indicator is provided with an enlarged head portion having an annular surface acted upon by the hydraulic fluid. Spring means are positioned around the elongated indicator such that one end thereof abuts the underside of the enlarged head and the other end thereof abuts the under surface of the seat. In operation, when pressurized fluid is normally moving through the hose, the fluid acts against the annular surface of the enlarged head, overcoming the force of the spring acting against the underside of the enlarged head. This maintains the elongated indicator in its first position. When there is a leak in the hose which diminishes the pressure of the fluid acting against the annular surface of the enlarged head, the force of the spring acting against the underside of the enlarged head overcomes the diminishing fluid pressure acting against the annular surface of the enlarged head and the elongated indicator moves to its second position.

BRIEF DESCRIPTION OF THE DRAWING

FIG. 1 is a vertical cross sectional view of a hose rupture indicator of the present invention shown attached at the union of a hose and pipe joint when pressurized fluid is normally moving through the hose and the indicator is completely within the body member.

FIG. 2 is a vertical cross sectional view similar to FIG. 1 when there is a leak in the hose which diminishes the pressure of the fluid therein, causing the indicator to conspicuously protrude through the body member.

FIG. 3 is an exploded, vertical cross sectional view of the hose rupture indicator of the present invention.

DESCRIPTION OF THE PREFERRED EMBODIMENT

Referring to the drawings it will be seen that the hose rupture indicator 10 of the present invention includes a seat 12 having a bore 14 therethrough. One end 12a of the seat 12 is adapted to be secured in communication with a hose 16 containing hydraulic fluid under pressure, and preferably at the union of the hose 16 at a pipe joint 18. The seat 12 preferably includes a threaded male portion 12a which is received by a mating female portion 18a of the pipe joint 18. If the operating pressure fluid in the line or hose 16 exceeds 3000 psi, it has been found that the joint between the seat 12 and the pipe joint 18 should preferably be straight threaded and provided with suitable seal means 46. However, if such pressure is less than 3000 psi, it has been found that a tapered pipe threaded joint between the seat 12 and the joint 18 is satisfactory.

The bore 14 of the seat member 12 is restricted as at 20. As will be more fully explained hereinafter, the restriction 20 of the bore 14 provides stop means in the seat 12 against the inward movement of the elongated indicator 22.

The other end 12b of the seat 12 is adapted to be secured to one end 24a of a body member 24 having a central bore 26 therethrough, with the bores 26 and 14 of the body member 24 and the seat 12 in axial alignment. The other end 24b of the body member 24 is provided with a concentric aperture 28 therethrough.

An elongated indicator or stem 30 is longitudinally movable within the bores 26 and 14 of the body member 24 and the seat 12. The elongated indicator 30 is provided with an enlarged head portion 32 having an annular surface 34 acted upon by the hydraulic fluid. Spring means 36 are positioned around the elongated indicator 30, with one end 36a thereof abutting the underside 33 of the enlarged head portion 32 and the other end 36b abutting the upper surface 13 of the seat 12.

The elongated indicator 30 is preferably provided with a central bore 38 extending from its lowermost end 30a, in communication with the bores 14 and 26 of the seat 12 and the body member 24, respectively, as the elongated indicator 30 moves longitudinally, and terminating beyond the enlarged head portion 32 with radial ducts 40 communicating therefrom to the bore 26 of the body member 24 above the annular surface 34 of the enlarged head 32.

Stop means comprising a shoulder portion 42 restricting the bore 26 of the body member 24 furnish a stop against the outward or upward movement of the elongated indicator 30. The radial ducts 40 are positioned within the elongated indicator 30 such that they will always be beneath the shoulder portion 42 and furnish communication between the fluid in the hose 16 and the annular surface 34 of the enlarged head portion 32 when the elongated indicator 30 is in its outward most position.

In practice it has been found that it is preferable for the periphery of the elongated indicator 30 to be enlarged at 44 above the enlarged head portion 32 so as to abut the shoulder portion 42 when the elongated indicator 30 is in its outward most position. As can be seen, the radial ducts 40 are positioned within the enlarged periphery at 44.

Suitable seal means 46, such as an O-ring or the like provided, if necessary, with a backup ring, are, of course provided between the periphery of the enlarged head portion 32 and the bore 26 of the body member 24. This assures that fluid within the bore 26 and acting against the annular shoulder 34 is unable to penetrate into that portion of the bore 26 beneath the enlarged head portion 32 and the end 13 of the seat 12. Seal means 46 are also provided between the periphery of the elongated indicator 30 and the bore 26 of the body member 24, which forms the concentric aperture 28, beyond the shoulder portion 42. Additionally, seal means 46 are provided between the periphery of the elongated indicator 30 and the bore 14 of the seat 12 above the restriction 20, such seal means 26 being located within the male portion 12b of the seat 12. Suitable seal means 46 may also be provided between the juncture of the body member 24 and the seat 12, and between the juncture of the seat 12 and the pipe joint 18.

It has been found that a suitable backup ring should preferably be used in combination with each 0-ring seal 46 if the operating pressure of the fluid exceeds 1500 psi in order to preclude the 0-ring seals from squeezing out of their respective bores.

A vent hole 48, located between the underside 33 of the enlarged head portion 32 and upper surface 13 of the seat 12, is provided through the body member 24 communicating with the bore 26 thereof.

A brass plug 50 may be secured to the end 30b of the elongated indicator 30 which protrudes through the concentric aperture 28 in the body member 24, such as by a press fit or threaded connection. The brass plug 50 also provides a color contrast against the body member 24. Accordingly, if the hose rupture indicator 10 is positioned at a junction where sufficient light exists for an operator to view this contrast, the rupture of the line or hose may be more easily located. In lieu of the plug 50, the end 30a of the elongated indicator may be painted with radium paint so that it will be visible in darkness.

In operation, a pipe joint 18 is provided joining two hoses 16 of a continuous miner or the like. When the continuous miner is in operation, fluid under pressure from the hose 16 acts upon the annular surface 34 of the enlarged head portion 32 of the indicator 30. As can be seen, the fluid communicates with the annular surface 34 through the radial ducts 40 and the bores 38 and 14 of the indicator 30 and the seat 12, respectively. When the pressurized fluid is normally moving through the hose 16, the fluid acts against the annular surface 34 of the enlarged head 32, overcoming the force of the spring 36 acting against the underside 33 of the enlarged head portion 32. This maintains the elongated indicator 30 in its first position, wherein the elongated indicator 30 is completely within the bores 26 and 14 of the body member 24 and the seat 12, respectively. When there is a leak in the hose 16 which diminishes the pressure of the fluid acting against the annular surface 34 of the enlarged head 32, the force of the spring 36 acting against the underside 33 of the enlarged head 32 overcomes the diminishing fluid pressure acting against the annular surface 34 of the enlarged head 32 and the elongated indicator 30 moves to its second position, wherein one end of the indicator 30 conspicuously protrudes through the concentric aperture 28 in the end 24b of the body member 24.

Stop means comprising the shoulder portion 42 restricting the bore 26 of the body member 24 furnishes a stop against the outward movement of the elongated indicator 30 when the enlarged periphery 44 of the elongated indicator 30 abuts the shoulder 42. As can be seen, the radial ducts 40 are positioned within the enlarged periphery 44 so that they will always be positioned beneath the shoulder portion 42 and furnish communication between the fluid from the hose 16 and the annular surface 34 of the enlarged head portion 32 when the elongated indicator is in its second position.

Stop means comprising a restriction 20 of the bore 14 in the seat 12 furnish a stop against the inward movement of the elongated indicator 30 by the spring 36 when the indicator 30 moves from the second position to the first position.

It should be emphasized that the operating pressure range of the hose rupture indicator 10 of the present invention varies from a fluid pressure of 500 psi to a fluid pressure of 5000 psi, and that desired operating pressures may be accommodated by changing the spring 36. It should also be emphasized that the hose rupture indicator 10 of the present invention is designed such that the indicator or stem 30 thereof will protrude from the body member 24 until the leaking hose has in fact been repaired, since normal fluid pressure through the hose and acting against the surface 34 of the enlarged head 32 is required before the indicator 30 will return to its first position within the hose indicator 10.

While certain preferred embodiments of the invention have been specifically illustrated and described, it is understood that the invention is not limited thereto, as many variations will be apparent to those skilled in the art, and the invention is to be given its broadest interpretations within the terms of the following claims.

The embodiments of the invention in which an exclusive property or privilege is claimed are defined as follows:

1. A hose rupture indicator including a seat having a bore therethrough, one end of said seat being adapted to be secured in communication with a hose containing hydraulic fluid under pressure, a body member having a central bore therethrough, one end of said body member being adapted to be secured to the other end of said seat, with the bores of said seat and said body member in axial alignment, and the other end of said body member having a concentric aperture therethrough, an elongated indicator longitudinally movable within the bores of said body member and said seat from a first position, wherein said elongated indicator is completely within the bores of said body member and said seat, to a second position, wherein one end of said indicator conspicuously protrudes through said concentric aperture, said elongated indicator having an enlarged head portion having an annular surface acted upon by the hydraulic fluid, spring means positioned around said elongated indicator one end of which abuts the underside of said enlarged head and the other end of which abuts the upper surface of said seat, whereby when pressurized fluid is normally moving through said hose, said fluid acts against the annular surface of said enlarged head, overcoming the force of said spring acting against the underside of said enlarged head, and maintains said elongated indicator in its first position, and when there is a leak in the hose which diminishes the pressure of the fluid acting against the annular surface of said enlarged head, the force of said spring acting against the underside of said enlarged head overcomes the diminishing fluid pressure exerted against the annular surface of said enlarged head and said elongated indicator moves to its second position.

2. The hose rupture indicator according to claim 1, wherein said elongated indicator is provided with a central bore extending from its lowermost end, in communication with the bores of said seat and said body member as said elongated indicator moves longitudinally, and terminating beyond said enlarged head portion with radial duct means communicating therefrom to the bore of said body member above said annular surface of said enlarged head.

3. The hose rupture indicator according to claim 2, wherein first stop means comprising a shoulder portion restricting the bore of said body member furnishes a stop against the outward movement of said elongated indicator and determines the second position thereof, said radial duct means being positioned within said elongated indicator so as to always be beneath said stop means and furnish communication between the fluid and the annular surface of said enlarged head when said elongated indicator is in its second position.

4. The hose rupture indicator according to claim 3, wherein the periphery of said elongated indicator is enlarged above said enlarged head so as to abut said stop means when said elongated indicator is in its second position, said radial ducts being positioned within said enlarged periphery.

5. The hose rupture indicator according to claim 4, wherein second stop means comprising a restriction of the bore in said seat furnished a stop against the inward movement of said elongated indicator by said spring means when said indicator moves from said second position to said first position, the inward most end of said elongated indicator abutting said second stop means when said elongated indicator is in its first position.

6. The hose rupture indicator according to claim 5, wherein seal means are provided between the periphery of said enlarged head and the bore of said body member.

7. The hose rupture indicator according to claim 6, wherein seal means are provided between the periphery of said elongated indicator and the bore of said body member beyond said first stop means.

8. The hose rupture indicator according to claim 7, wherein seal means are provided between the periphery of said elongated indicator and the bore of said seat above said second stop means.

9. The hose rupture indicator according to claim 8, wherein said seat includes a male portion which is threadedly received within a mating female portion of said body member, and wherein said seal means between the periphery of said elongated indicator and the bore of said seat are located in said male portion.

10. The hose rupture indicator according to claim 9, wherein a vent hole is provided through said body member communicating with the bore thereof, said vent hole being located between the underside of said enlarged head and the upper surface of said seat.

11. The house rupture indicator according to claim 10, wherein a brass plug is secured to said one end of said elongated indicator, the periphery of said brass plug substantially conforming to the concentric aperture in said body member.

12. The house rupture indicator according to claim 10, wherein the end of said elongated indicator is painted with a radium paint.

* * * * *